United States Patent
Towkan (10) Patent No.: US 9,527,578 B2
(45) Date of Patent: Dec. 27, 2016

(54) PROPELLERS FOR AIRCRAFT

(75) Inventor: Michael Fedor Towkan, Gloucester (GB)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 437 days.

(21) Appl. No.: 13/190,704

(22) Filed: Jul. 26, 2011

(65) Prior Publication Data

US 2012/0034095 A1    Feb. 9, 2012

(30) Foreign Application Priority Data

Aug. 6, 2010  (GB) .................................. 1013261.1

(51) Int. Cl.
*B64C 11/06* (2006.01)
*B64C 11/48* (2006.01)

(52) U.S. Cl.
CPC ............... *B64C 11/06* (2013.01); *B64C 11/48* (2013.01)

(58) Field of Classification Search
CPC ........ B64C 27/001; B64C 11/00; B64C 11/48; B64C 2027/8254; Y10S 416/50; F01D 5/10
USPC ............... 416/139, 144, 145, 500, 124, 126, 128, 416/129, 134 A; 415/66, 68, 99–101
See application file for complete search history.

(56) References Cited

U.S. PATENT DOCUMENTS

| | | | | |
|---|---|---|---|---|
| 1,868,008 A | * | 7/1932 | Gardner | 416/203 |
| 2,043,704 A | * | 6/1936 | McPherren | 244/7 B |
| 2,087,919 A | * | 7/1937 | Mascuch et al. | 416/232 |
| 2,382,460 A | * | 8/1945 | Young | 244/7 B |
| 2,407,791 A | * | 9/1946 | Martin et al. | 416/45 |
| 2,419,787 A | * | 4/1947 | Muffly | 416/129 |
| 2,519,762 A | * | 8/1950 | Hoffmann et al. | 416/18 |
| 2,691,419 A | | 10/1954 | Andersen | |
| 2,982,361 A | * | 5/1961 | Rosen | 416/44 |
| 3,219,120 A | * | 11/1965 | Hooper | 416/145 |
| 3,298,443 A | * | 1/1967 | Burkam et al. | 416/31 |
| 3,372,758 A | * | 3/1968 | Jenney | 416/103 |
| 3,540,809 A | * | 11/1970 | Mard et al. | 416/1 |
| 3,700,351 A | | 10/1972 | Flux | |
| 3,867,062 A | * | 2/1975 | Troller | 415/194 |

(Continued)

FOREIGN PATENT DOCUMENTS

CN    1910081 A    2/2007
FR    2608994 A1   7/1988

(Continued)

OTHER PUBLICATIONS

Search Report from FR Application No. 1156822 dated Sep. 24, 2013.

(Continued)

*Primary Examiner* — Igor Kershteyn
*Assistant Examiner* — Eldon Brockman
(74) *Attorney, Agent, or Firm* — GE Global Patent Operation; William S. Munnerlyn (57) ABSTRACT

One aspect of the present invention provides a propeller for an aircraft. The propeller comprises a propeller hub, a spinner for streamlining the propeller and a plurality of composite propeller blades mounted to the propeller hub. The propeller blades are arranged to rotate together in the same rotational direction in at least two parallel planes substantially perpendicular to an axis of rotation of the propeller. The propeller has a reduced sized spinner with an improved aerodynamic profile that can be better matched to an engine nacelle and also has reduced drag.

17 Claims, 4 Drawing Sheets

(56) References Cited

U.S. PATENT DOCUMENTS

| | | | |
|---|---|---|---|
| 3,988,074 A * | 10/1976 | Kenigsberg et al. | 416/145 |
| 4,097,189 A * | 6/1978 | Harlamert | B64C 11/38 |
| | | | 416/154 |
| 4,171,183 A | 10/1979 | Cornell et al. | |
| 4,407,635 A | 10/1983 | Grimes et al. | |
| 4,446,696 A * | 5/1984 | Sargisson et al. | 60/226.3 |
| 4,483,658 A * | 11/1984 | Levine | 416/130 |
| 4,483,659 A * | 11/1984 | Armstrong | 416/200 R |
| 4,545,726 A * | 10/1985 | Holliger | 415/26 |
| 4,599,041 A | 7/1986 | Stricker | |
| 4,784,575 A * | 11/1988 | Nelson et al. | 416/226 |
| 4,883,240 A * | 11/1989 | Adamson et al. | 244/69 |
| 4,913,623 A * | 4/1990 | Schilling | B64C 11/346 |
| | | | 416/129 |
| 5,061,153 A * | 10/1991 | Pace | B64C 11/40 |
| | | | 416/46 |
| 5,066,195 A * | 11/1991 | Dobrzynski | 416/200 R |
| 5,096,383 A * | 3/1992 | Dobrzynski | 416/200 R |
| 5,190,441 A * | 3/1993 | Murphy et al. | 416/129 |
| 5,240,374 A * | 8/1993 | Speer | 416/140 |
| 5,316,442 A * | 5/1994 | Mouille | 416/134 A |
| 5,326,223 A * | 7/1994 | Speer | 416/46 |
| 5,383,767 A | 1/1995 | Aubry | |
| 5,431,539 A | 7/1995 | Carvalho | |
| 5,551,649 A * | 9/1996 | Kaptein | 244/1 N |
| 5,566,907 A * | 10/1996 | Marze et al. | 244/17.19 |
| 5,634,611 A * | 6/1997 | Marze et al. | 244/17.19 |
| 5,820,344 A * | 10/1998 | Hamilton et al. | 416/134 A |
| 5,836,743 A * | 11/1998 | Carvalho | B64C 11/385 |
| | | | 416/139 |
| 6,050,778 A * | 4/2000 | McArdle et al. | 416/107 |
| 6,155,784 A | 12/2000 | Carter | |
| 6,439,838 B1 * | 8/2002 | Crall et al. | 415/119 |
| 7,581,929 B2 * | 9/2009 | Carvalho | 416/145 |
| 8,286,908 B2 * | 10/2012 | Kebrle et al. | 244/17.19 |
| 8,398,372 B2 * | 3/2013 | Lombard et al. | 416/128 |
| 2004/0179941 A1 * | 9/2004 | Negulescu | 416/120 |
| 2004/0222329 A1 * | 11/2004 | Kuhns et al. | 244/6 |
| 2007/0068467 A1 * | 3/2007 | Stone | 123/45 R |
| 2008/0219848 A1 | 9/2008 | Akaro et al. | |
| 2009/0269200 A1 * | 10/2009 | Karem | 416/148 |
| 2010/0104443 A1 | 4/2010 | Pentony | |
| 2011/0155841 A1 * | 6/2011 | Cranga et al. | 244/17.11 |
| 2012/0025016 A1 * | 2/2012 | Methven et al. | 244/1 N |
| 2013/0032664 A1 * | 2/2013 | Kebrle et al. | 244/1 N |

FOREIGN PATENT DOCUMENTS

| | | |
|---|---|---|
| GB | 550117 A | 12/1942 |
| GB | 872687 A | 7/1961 |
| GB | 1189444 A | 4/1970 |
| GB | 2066370 A | 7/1981 |
| GB | 2197913 A | 6/1988 |
| JP | 57164895 A | 10/1982 |
| JP | 6058498 U | 4/1985 |
| JP | 2000352398 A | 12/2000 |
| WO | 2009097850 A1 | 8/2009 |

OTHER PUBLICATIONS

GB Search Report issued in priority GB Application 1013261.1 Date of Search Report Dec. 6, 2010 (8 Pages).
Unofficial English Translation of Chinese Office Action issued in connection with corresponding CN Application No. 201110230261.9 on Nov. 28, 2014.
A Great Britain Office Action issued in connection with corresponding GB Application No. 1013261.1 on Jun. 1, 2016.
Unofficial English Translation of Japanese Office Action issued in connection with corresponding JP Application No. 2011162705 on Apr. 14, 2015.

* cited by examiner

PROPELLERS FOR AIRCRAFT

BACKGROUND OF THE INVENTION

Field of the Invention

The field of the present invention relates generally to propellers for aircraft. More particularly, the field of the present invention relates to a propeller having a plurality of composite propeller blades.

Description of Related Art

In aviation it is known to use propellers having one or more propeller blades to generate an airflow to which an airframe can react, for example, so as to generate a forward thrust to propel an aircraft. It is also known that such propellers may be of variable pitch such that the angle of attack of the propeller blades relative to an airflow can be adjusted in order to optimise propeller performance when operating at any particular speed.

Recently, improvements in propeller blade design have led to the increased use of composite materials to form the blades. The composite materials have weight advantages when compared to conventional metallic propeller blades.

However, whilst composite propeller blades have numerous advantages, the materials used to form them have to be shaped so as to provide generally smooth and gradual transitions in shape from an aerofoil section to a supporting blade root because the fibres that are used cannot be made to change direction abruptly without losing a substantial amount of their mechanical strength. This contrasts with metallic blades, and means that, generally, the non-aerofoil portion of composite blades is greater in length than for metallic blades of comparable aerodynamic performance.

Additionally, composite blades that are to be used in variable pitch propellers require a generally circular cross-sectioned root portion to engage with known pitch change bearings. Thus, for a given aerofoil size, a variable pitch propeller having composite blades will generally have an even greater diameter than a metallic-bladed equivalent because of the length of the transition from the aerofoil to the generally circular sectioned root. This results in the composite version of the propeller needing a relatively larger spinner size with an attendant increase in drag, as well as giving rise to design difficulties in matching the spinner to the nacelle of the aircraft when trying to optimise overall aircraft aerodynamic performance.

BRIEF SUMMARY OF THE INVENTION

Embodiments of the present invention have therefore been devised whilst bearing the above-mentioned drawbacks associated with known composite aircraft propellers in mind.

According to an aspect of the present invention, there is provided a propeller for an aircraft. The propeller comprises a propeller hub, a spinner for streamlining the propeller and a plurality of composite propeller blades mounted to the propeller hub. The propeller blades are arranged to rotate together in the same rotational direction in at least two parallel planes substantially perpendicular to an axis of rotation of the propeller.

By providing such a plurality of composite propeller blades mounted in at least two parallel planes, various aspects and embodiments of the present invention can be provided having a reduced diameter spinner with an improved aerodynamic profile that can be matched to an engine nacelle and having a reduced drag profile for both variable and non-variable pitch propellers.

BRIEF DESCRIPTION OF THE SEVERAL VIEWS OF THE DRAWINGS

Various aspects and embodiments of the present invention will now be described in connection with the accompanying drawings, in which.

DETAILED DESCRIPTION OF THE INVENTION

Figure 1:
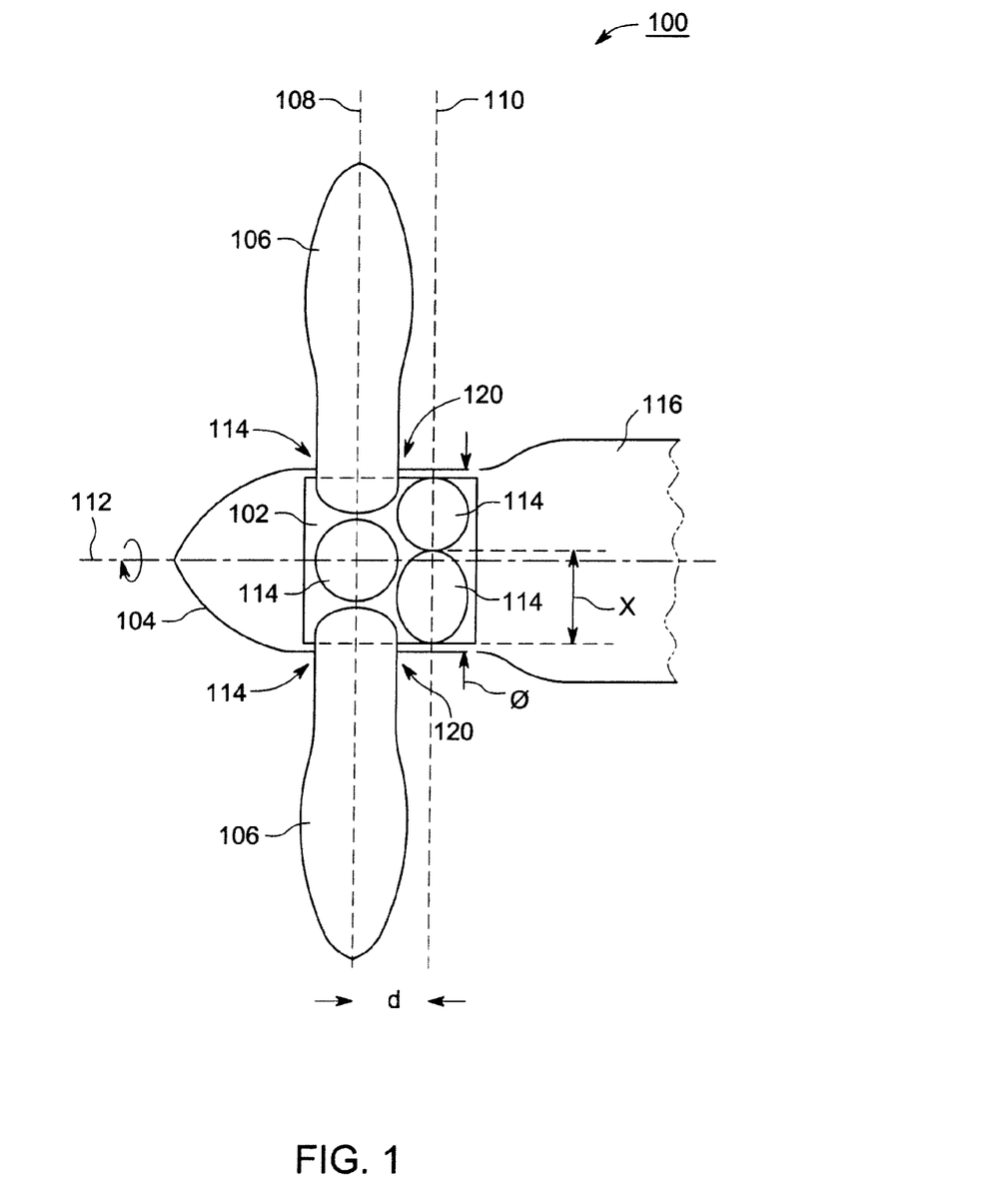
FIG. 1 shows a schematic diagram illustrating a propeller in accordance with an embodiment of the present invention.

FIG. 1 shows a schematic diagram illustrating a propeller 100 for an aircraft in accordance with an embodiment of the present invention. The propeller 100 comprises a propeller hub 102 that is rotatably driven by an aircraft engine (not shown) housed in a nacelle 116.

A spinner 104 is provided encasing the propeller hub 102 for streamlining the propeller 100. In this embodiment, the spinner 104 is fixed to the propeller hub 102 such that they rotate together when the propeller hub 102 is driven by the aircraft engine. The spinner 104, which is generally cone-shaped with a largest diameter denoted by $\phi$, provides a streamlined interface between the rotatable propeller 100 and the fixed position nacelle 116.

A plurality of composite propeller blades 106 are mounted to the propeller hub 102, and project through the spinner 104, such that the spinner 104 provides streamlining for air flowing near to roots 120 of the blades 106. For example, the blades 106 may comprise woven fibre material, such as one or more of carbon fibre and glass fibre. Certain preferred embodiments use carbon reinforced epoxy resin composites because of their strength properties.

In this embodiment, the roots 120 of the blades 106 (only two of which are shown for clarity) are mounted to the propeller hub by pitch change bearings 114. For example, the current propeller designed for the Bombardier Dash™ 8Q400 is a six bladed design where this technology may be applied to give a reduced hub diameter and a more rapid radial transition to an aerofoil section. However, various bearings 114 may be used such as, for example, those manufactured by RPP (Revolvo™). Alternatively, various angular contact type bearings can be used for an inner thrust race, with radial type roller bearings being suitable for use in an outer race.

The pitch change bearings 114, with their associated propeller blades 106, are provided in two adjacent planes, namely a first plane 108 and a second plane 110 separated by an axial separation distance denoted by d. The first plane 108 is provided distal from the nacelle 116 and the second plane 110 lies longitudinally closer to the nacelle 116. The pitch change bearings 114 are generally cylindrical in shape and have a diameter denoted as x in FIG. 1. The propeller blades 106 are thus arranged to rotate together in the same rotational direction in the first and second planes 108, 110, where the planes 108, 110 are substantially perpendicular to an axis of rotation 112 of the propeller 100.

In various preferred embodiments, the number of planes 108, 110 is two. This is preferred as it provides a simplified propeller construction which is relatively easy to maintain and inspect. However, embodiments of the present invention are not limited merely to the use of two such planes, and more than two may be used.

Five pitch change bearings 114 are shown in FIG. 1 for clarity purposes only in order to illustrate schematically how various embodiments of the present invention can provide an increased blade packing density in the axial direction. As neighbouring blades 106 in adjacent planes 108, 110 may be circumferentially offset with respect to one another, roots 120 of the blades 106 may be axially packed in close proximity, e.g. such that d<x. Such an increased blade packing density enables a reduced diameter propeller hub 102 to be used, and consequently a correspondingly reduced diameter spinner 104 may also be used to streamline that propeller hub 102.

An equal number of blades 106 may be provided in each respective plane 108, 110. This simplifies propeller design and ensures optimal balancing such that uneven wear and vibration are minimised.

The number of blades, N, in any particular plane 108, 110 may be selected such that a ratio, R, of the spinner diameter $\phi$ to the blade root 120 or pitch change bearing diameter x is such that $1 \leq R \leq 2$, where $$R = \frac{\phi}{x}.$$

Preferably $1 \leq R \leq \sqrt{2}$ and N=2, 3 or 4, however, such that optimal thrust generation can be provided by the propeller 100 with a small diameter spinner 104.

Figure 2:
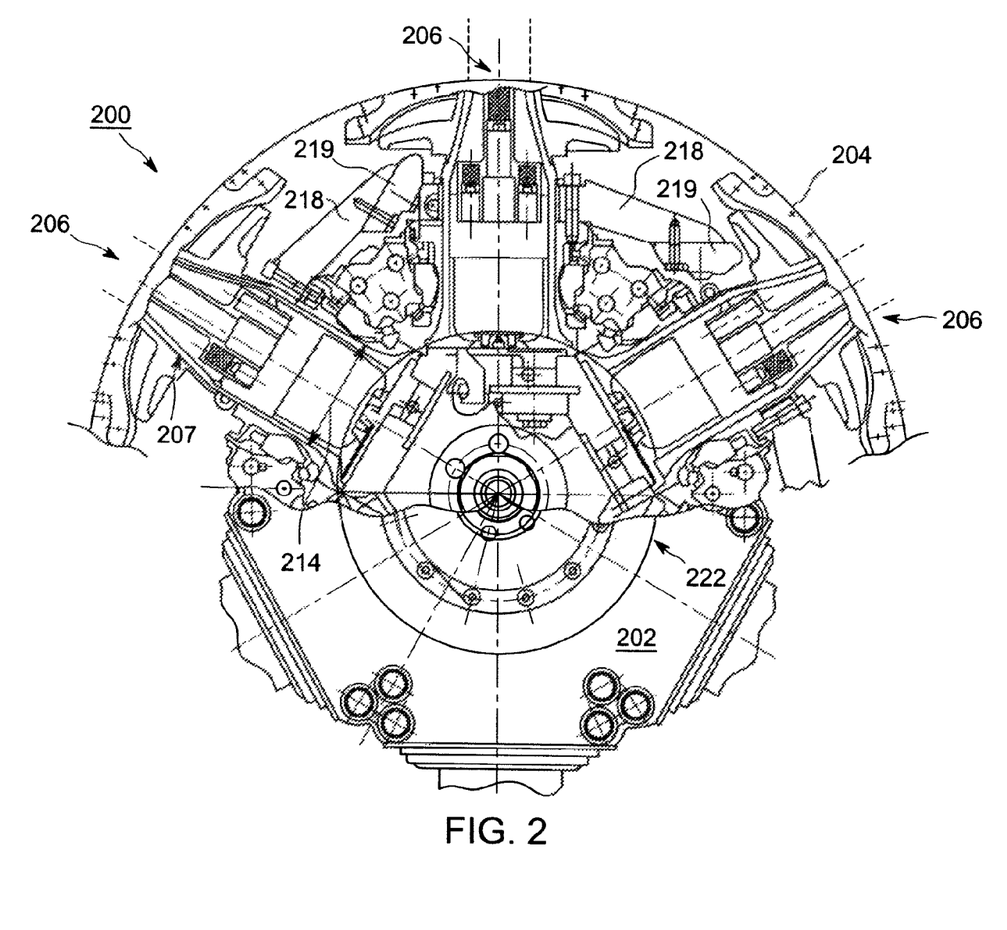
FIG. 2 shows a cross-section taken through a conventional propeller arrangement.

FIG. 2 shows a cross-section taken through a conventional propeller arrangement 200. The propeller 200 includes six propeller blades 206 arranged in a coplanar hexagonal configuration. Only three of the blades 206 are shown to aid clarity.

The propeller blades 206 are mounted to a propeller hub 202 using pitch change bearings 214. A spinner 204 is provided about the propeller hub 202, radially outside of which the blades 206 are provided with an aerofoil profile that can be optimised for propeller performance. The blades 206 have circular cross-sectioned end portions provided within the pitch change bearings 214 which transition to the aerofoil profiles at respective blade transition regions 207.

Each blade 206 is provided with an associated counterweight arm 218. The counterweight arms 218 are connected to a respective blade 206 and disposed within the plane of rotation of the propeller 200 between the associated blade 206 and a nearest neighbouring blade 206. Respective counterweights 219 are provided connected to the counterweight arms 218 distal from the blades 206 to which they are attached. Such counterweights 219 may be made from sintered tungsten, for example.

In operation, the counterweights 219 and counterweight arms 218 provide a balancing torque force to the blades 206 in order to minimise control loads and also to provide a mechanism for auto-coarsening of the blades to minimise aerodynamic drag in the event of primary control system failure. The magnitude of the balancing torque force generated depends upon the weight distribution and length of the combined counterweights 219 and counterweight arms 218.

Also shown in FIG. 2 is a circle 222 which covers the six touching blade root sleeves of respective pitch change bearings 214 provided in the hexagonal configuration. The size of the propeller hub 202 has to be large enough to house this configuration and thus the geometrical configuration of the blade root sleeves effectively limits the minimum size of the propeller hub 202 and consequently also the spinner 204. In this configuration, with six blades 206, the diameter of the circle 222 is twice that of the individual blade root sleeves, and hence the diameters of both the propeller hub 202 and the spinner 204 cannot be less than this value.

Figure 3:
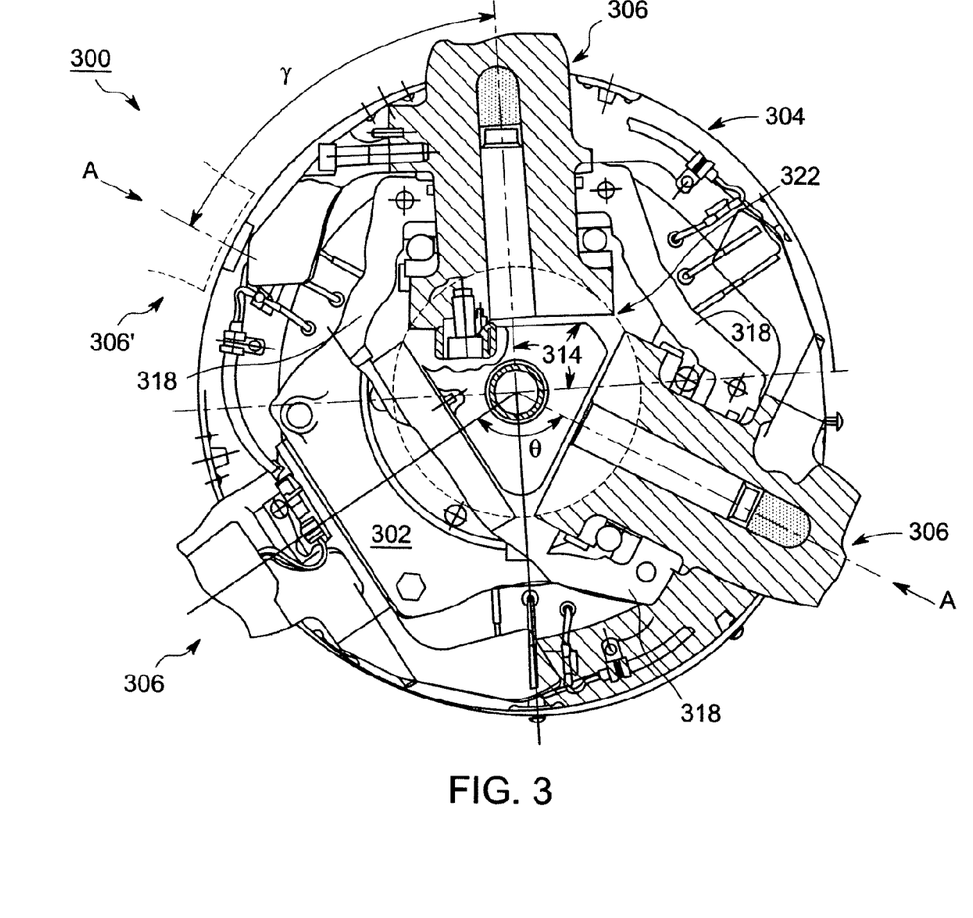
FIG. 3 shows a cross-section taken through a propeller arrangement in accordance with an embodiment of the present invention.

FIG. 3 shows a cross-section taken through a first plane 308 of a propeller 300 in accordance with an embodiment of the present invention. The propeller 300 includes six propeller blades 306, 306'. Three of the propeller blades 306 are arranged in a coplanar equilateral triangular configuration in the first plane 308 and the other three blades 306' are arranged in a coplanar equilateral triangular configuration in a second plane 310 (also see FIG. 4, for example) that is axially offset from the first plane 308.

The blades 306 in the first plane 308 shown in FIG. 3 are angularly separated by blade separation angle θ, which in this embodiment is equal for all blades 306 at 120°. Blades 306 in the first plane 308 are angularly offset with respect to blades 306' in the second plane 310 by a circumferential offset γ, which in this embodiment is equal to 60° for all blades 306'.

In alternative embodiments, however, θ may vary between the blades provided in any particular plane such that noise reduction can be effected by eliminating various harmonic beating phenomena. For example, three blades may be provided separated respectively by θ=119°, 120° and 121°. Various modifications to the circumferential offset can also be made for similar purposes such that one or both of θ and γ may be used to tailor the noise profile, aerodynamic performance, vibration characteristics, etc. of the propeller.

The propeller blades 306, 306' are mounted to a propeller hub 302 using pitch change bearings 314. A spinner 304 is provided about the propeller hub 302, radially outside of which the blades 306, 306' are provided with an aerofoil profile that can be optimised for propeller performance. The spinner 304 is axially mounted to the propeller hub 302 and configured to provide an aerodynamic profile for the propeller 300 by deflecting airflow away from root sections of the propeller blades 306, 306' mounted in the propeller hub 302.

The blades 306, 306' have circular cross-sectioned end portions 320 provided within blade root sleeves forming part of the pitch change bearings 314. The blade root sleeves can be brought closer to the propeller axis 312 than for a comparable single plane propeller arrangement (such as that shown in FIG. 2, for example). This means that the transition region of the blades 306, 306' from root to aerofoil section can also be brought closer to the centre of the propeller hub 302, allowing for further compacting of the propeller 300 in the radial direction.

Each blade 306 in the first plane 308 is provided with an associated counterweight arm 318. The counterweight arms 318 are connected to a respective blade 306 and disposed within the first plane of rotation 308 of the propeller 300 between the associated blades 306 and their nearest neighbouring blades 306. Respective counterweights (not shown) may also be provided connected to the counterweight arms 318 distal from the blades 306 to which they are attached.

Moreover, since the counterweight arms 318 can be made longer than for comparable single plane propellers, such as that depicted in FIG. 2 for example, it is possible to dispense with the need to provide counterweights between the blades 306' in the second plane 310 since the longer arms provide a greater balancing torque force for a given weight. The propeller 300 is thus not only simplified compared to conventional propellers but also has a reduced total weight. Additionally, such a simplified construction has benefits of improved operational reliability and reduced maintenance time/costs as the propeller components are made easily accessible and inspectable.

Shown in FIG. 3 is a circle 322 which covers the three touching blade root sleeves of respective pitch change bearings 314 provided in the first plane 308. The size of the propeller hub 302 has to be large enough to house this configuration and thus the geometrical configuration of the blade root sleeves effectively limits the minimum size of the propeller hub 302 and consequently also the spinner 304. In this equilateral triangular configuration, with three blades 306, the diameter of the circle 322 is approximately 1.16 times that of the individual blade root sleeves, and hence this configuration is radially more compact compared to conventional propellers such as that of FIG. 2. The diameters of the 306, 306', the propeller hub 302 and the spinner 304 can thus be reduced when compared to conventional propellers allowing for better aerodynamic matching to an engine nacelle as well as lower drag in use.

Figure 4:
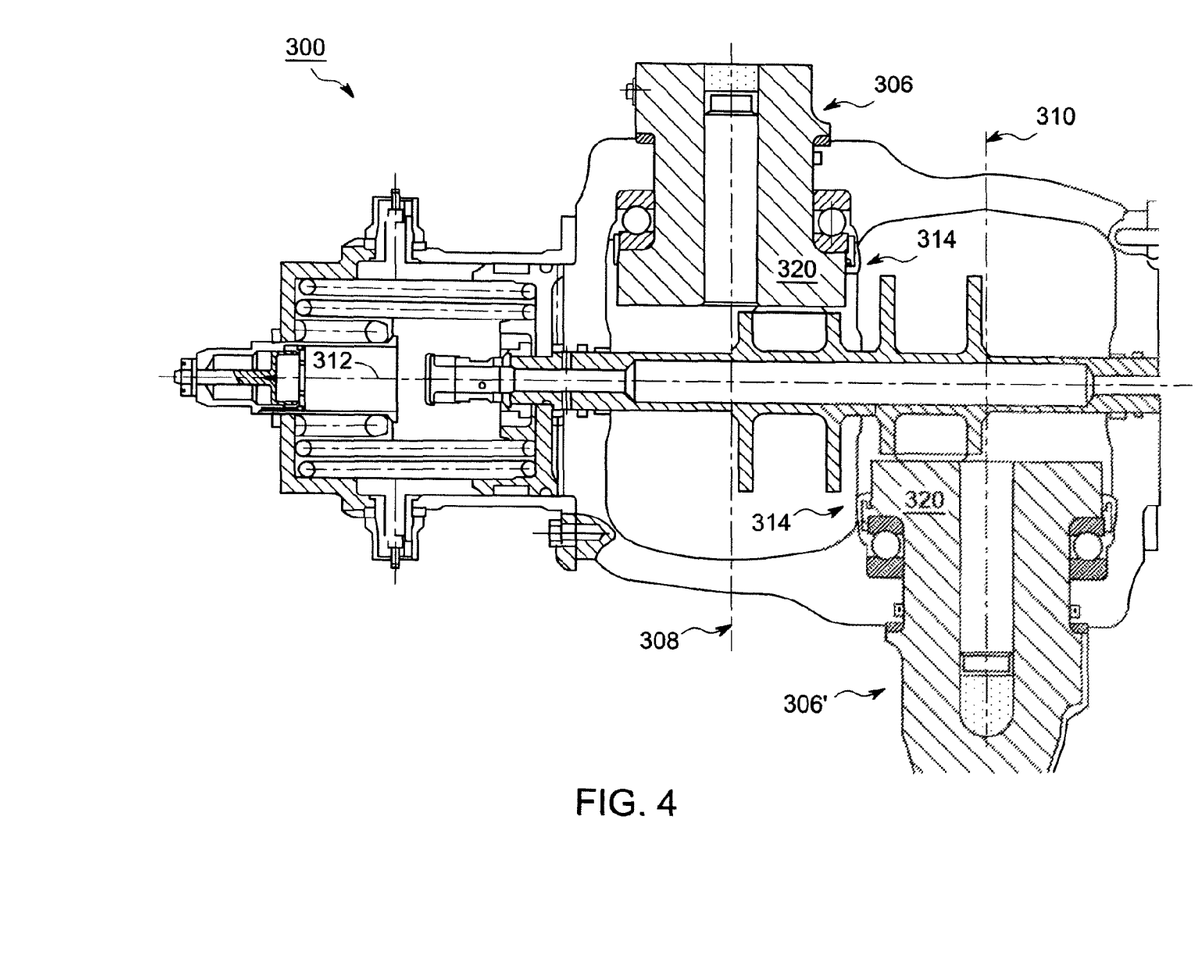
FIG. 4 shows a longitudinal section taken through the propeller arrangement shown in FIG. 3.

FIG. 4 shows a longitudinal section taken through the propeller 300 of FIG. 3 taken along the line A-A. Blades 306 are provided in the first plane 308. Blades 306' are provided in the second plane 310. In operation, the propeller 300 rotates about the axis of rotation 312 such that the propeller blades 306, 306' rotate together in the same rotational direction.

By providing such a propeller 300, thinner aerofoil sections of the blades 306, 306' can be provided at the points where the blades 306, 306' enter the airstream. This provides for a further aerodynamic efficiency improvement as well as for a reduced noise propeller. In various embodiments, the applicant has also found that such a propeller arrangement enables a 30% reduction in nacelle diameter to be achieved.

In various alternative embodiments, the blades 306, 306' may be axially interleaved such that the separation between the planes 308, 310 is less than the diameter of the individual blade root sleeves.

For various embodiments, the number of blades and/or planes provided is not limiting. For example, blade roots may be arranged proximal to each other with two blades being provided in at least one plane. However, for practical reasons, the total number of blades may be limited, for example, to four, six, eight, ten or twelve. In certain embodiments, preferably six or eight blades are provided, e.g. in two planes, in order to optimise propeller aerodynamic efficiency. Advantageously, various embodiments may also be provided having tailored and/or reduced operating noise profiles.

Those skilled in the art will also realise that various embodiments of propellers in accordance with the present invention may be provided. For example, whilst the preferred embodiments described herein use variable pitch propeller blades, those skilled in the art would be aware that fixed pitch propeller blades may also be used. Such fixed pitch propeller blades may, for example, be mounted to a propeller hub using known propeller blade retention mechanisms [6].

What is claimed is:

1. A propeller for an aircraft, the propeller comprising:
   a propeller hub including a plurality of pitch change bearings;
   a spinner encasing the propeller hub;
   a plurality of composite propeller blades, each blade passing through the spinner and mounted to one of the plurality of pitch change bearings of said propeller hub, wherein said propeller blades are arranged to rotate together in the same rotational direction in at least two parallel planes substantially perpendicular to an axis of rotation of the propellers, wherein neighboring blades in adjacent planes are circumferentially offset with respect to one another; and
   a plurality of counterweight arms, each counterweight arm connected to respective propeller blades arranged in a selected one of the at least two parallel planes, and disposed between the respective propeller blades.

2. The propeller of claim 1, wherein roots of the blades are axially packed in close proximity.

3. The propeller of claim 1, wherein a separation angle of blades in a first plane included in the at least two parallel planes is not equal to a separation angle of blades in a second plane included in the at least two parallel planes.

4. The propeller of claim 1, wherein an equal number of blades are arranged in each of the at least two parallel planes.

5. The propeller of claim 1, wherein the at least two parallel planes includes two parallel planes.

6. The propeller of claim 1, wherein the plurality of blades includes at least one of four, six, eight, ten or twelve propeller blades.

7. The propeller of claim 1, wherein respective blades in at least one of the at least two parallel planes are separated by the same separation angle.

8. The propeller of claim 1, wherein a quantity of blades in at least one of the at least two parallel planes is selected such that a ratio of spinner diameter to pitch change bearing diameter is greater than or equal to one and less than or equal to two.

9. The propeller of claim 1, wherein the pitch change bearings are arranged in a substantially triangular pattern within at least one of the at least two parallel planes.

10. The propeller of claim 1, wherein blade roots are arranged proximal to each other with at least two blades being provided in at least one of the at least two parallel planes.

11. The propeller of claim 1, wherein the set of counterweight arms are made from sintered tungsten.

12. The propeller of claim 11, wherein the selected one of the at least two parallel planes is a forward most plane.

13. The propeller of claim 1, wherein the composite blades comprise woven fibre material.

14. The propeller of claim 13, wherein the woven fibre material comprises one or more of carbon fibre and glass fibre.

15. A propeller, comprising:
   a propeller hub;
   a first set of propeller blades mounted to the propeller hub in a first plane substantially perpendicular to an axis of rotation of the propeller, wherein adjacently mounted propeller blades in the first set are separated by a predetermined angular separation;
   a second set of propeller blades connected to the propeller hub in a second plane substantially adjacent to the first plane and substantially perpendicular to an axis of rotation of the propeller, wherein propeller blades in the second set have an angular offset, with respect to propeller blades in the first set, of about half the predetermined angular separation; and a set of counterweight arms connected to respective propeller blades included in the first set of propeller blades, and disposed between the adjacently mounted propeller blades.

16. The propeller set of propellers of claim 15, wherein at least one of the first set of propeller blades or second set of propeller blades include composite propeller blades.

17. The propeller of claim 15, wherein at least one counterweight arm included in the set of counterweight arms is made from sintered tungsten.

* * * * *

UNITED STATES PATENT AND TRADEMARK OFFICE
CERTIFICATE OF CORRECTION

PATENT NO. : 9,527,578 B2  Page 1 of 1
APPLICATION NO. : 13/190704
DATED : December 27, 2016
INVENTOR(S) : Towkan It is certified that error appears in the above-identified patent and that said Letters Patent is hereby corrected as shown below:

On the Title Page

On Page 2, in Item (56), under "FOREIGN PATENT DOCUMENTS",
in Column 2, Line 9, delete "2009097850 A1" and insert -- 2009097850 A2 -- therefor.

In the Claims

In Column 7, Line 5, in Claim 16, delete "propeller set of propellers of" and insert -- propeller of --, therefor.

Signed and Sealed this
Twenty-eighth Day of February, 2017

Michelle K. Lee
*Director of the United States Patent and Trademark Office*